(12) United States Patent
Yoshii

(10) Patent No.: US 6,944,329 B2
(45) Date of Patent: Sep. 13, 2005

(54) INFORMATION PROCESSING METHOD AND APPARATUS

(75) Inventor: Hiroto Yoshii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 09/924,985

(22) Filed: Aug. 9, 2001

(65) Prior Publication Data

US 2002/0021841 A1 Feb. 21, 2002

(30) Foreign Application Priority Data

Aug. 17, 2000 (JP) ........................................ 2000-247641
Jul. 26, 2001 (JP) ........................................ 2001-226354

(51) Int. Cl.[7] ................................................ G06K 9/70
(52) U.S. Cl. ...................................... 382/159; 382/226
(58) Field of Search ............................... 382/226, 224, 382/225, 155, 159

(56) References Cited

U.S. PATENT DOCUMENTS

| | | | | |
|---|---|---|---|---|
| 5,142,593 A | * | 8/1992 | Kasano ........................ | 382/170 |
| 5,634,087 A | * | 5/1997 | Mammone et al. ........... | 706/25 |
| 5,745,601 A | * | 4/1998 | Lee et al. ..................... | 382/225 |
| 5,748,307 A | | 5/1998 | Nakamura et al. .......... | 258/296 |
| 5,978,497 A | * | 11/1999 | Lee et al. ..................... | 382/133 |
| 6,009,199 A | * | 12/1999 | Ho ............................... | 382/224 |
| 6,185,333 B1 | | 2/2001 | Arai et al. .................... | 382/187 |
| 6,351,561 B1 | * | 2/2002 | Iyengar ........................ | 382/226 |

FOREIGN PATENT DOCUMENTS

JP 9-187019 7/1997

OTHER PUBLICATIONS

Setiono et al. "A Connectionist Approach to Generating Oblique Decision Trees." IEEE Trans. on Systems, Man and Cybernetics, vol.29, No. 3, Jun. 1999, pp. 440–444.*
Iyengar. "HOT: Heuristics for Oblique Trees." Proc. 11th IEEE Int. Conf. on Tools with Artificial Intelligence, Nov. 9, 1999, pp. 91–98.*
"Classification and Regression Trees", L. Breiman, et al., Chapman & Hall, Inc., pp. 33, 1993.

* cited by examiner

Primary Examiner—Jon Chang
(74) Attorney, Agent, or Firm—Fitzpatrick, Cella, Harper & Scinto

(57) ABSTRACT

The present invention relates to an information processing method for recognizing a pattern of an image, character, speech or the like. According to the method, a feature space in which a point set given as learning patterns is present is divided to form a classification tree on the basis of the learning patterns. The method comprises the linear combination feature amount generation step of generating a new feature amount by a linear combination of the feature amounts of the learning patterns; the hierarchization pre-preprocessing step of hierarchizing, in advance, the new feature amount generated in the linear combination feature amount generation step; and the classification tree generation step of generating a classification tree on the basis of the learning patterns hierarchized in the hierarchization pre-processing step.

11 Claims, 9 Drawing Sheets

FIG. 5
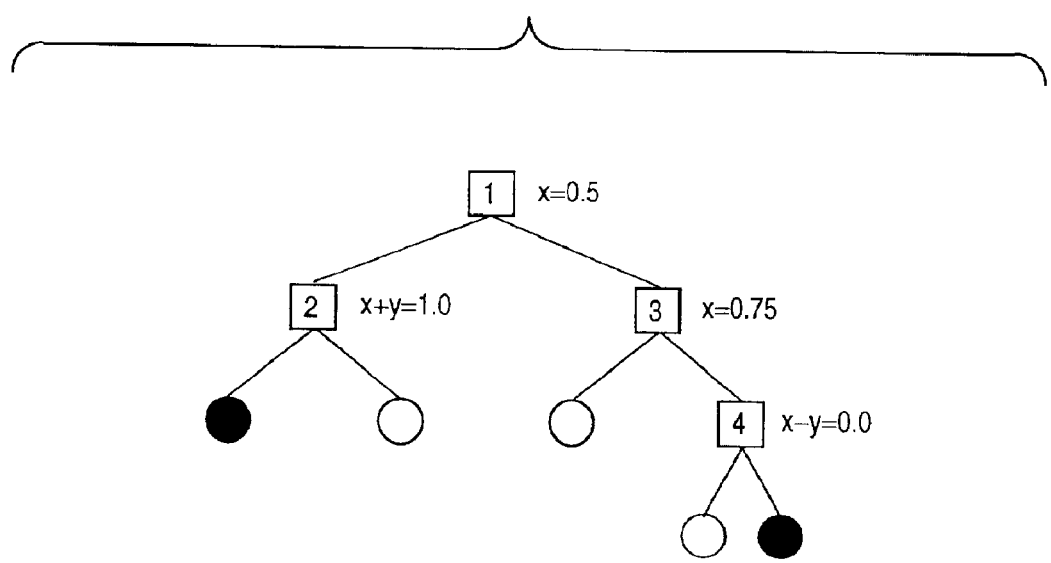
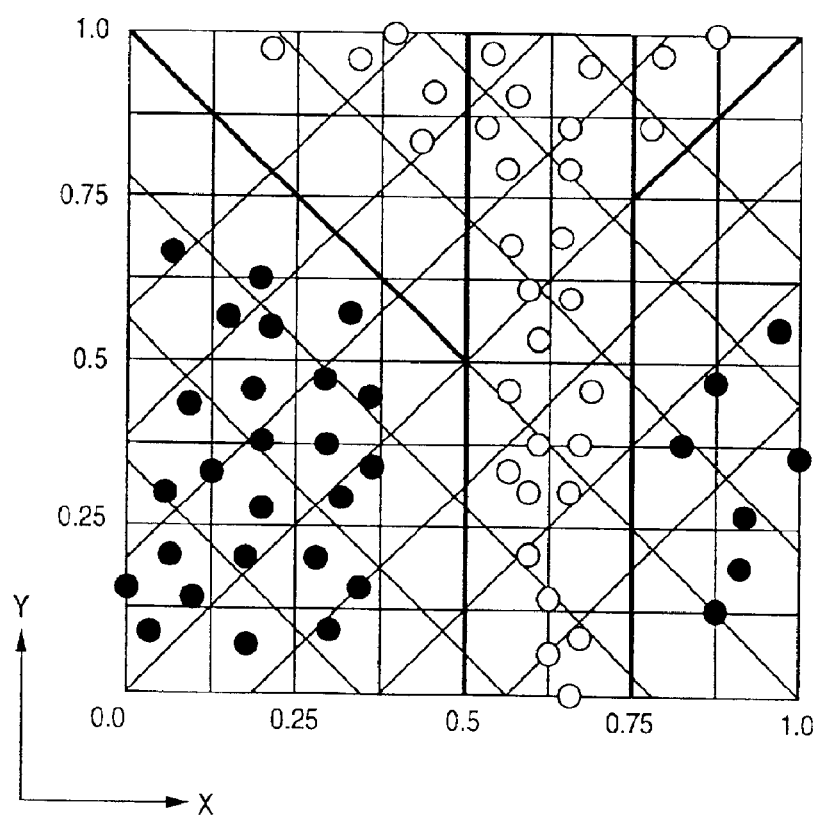

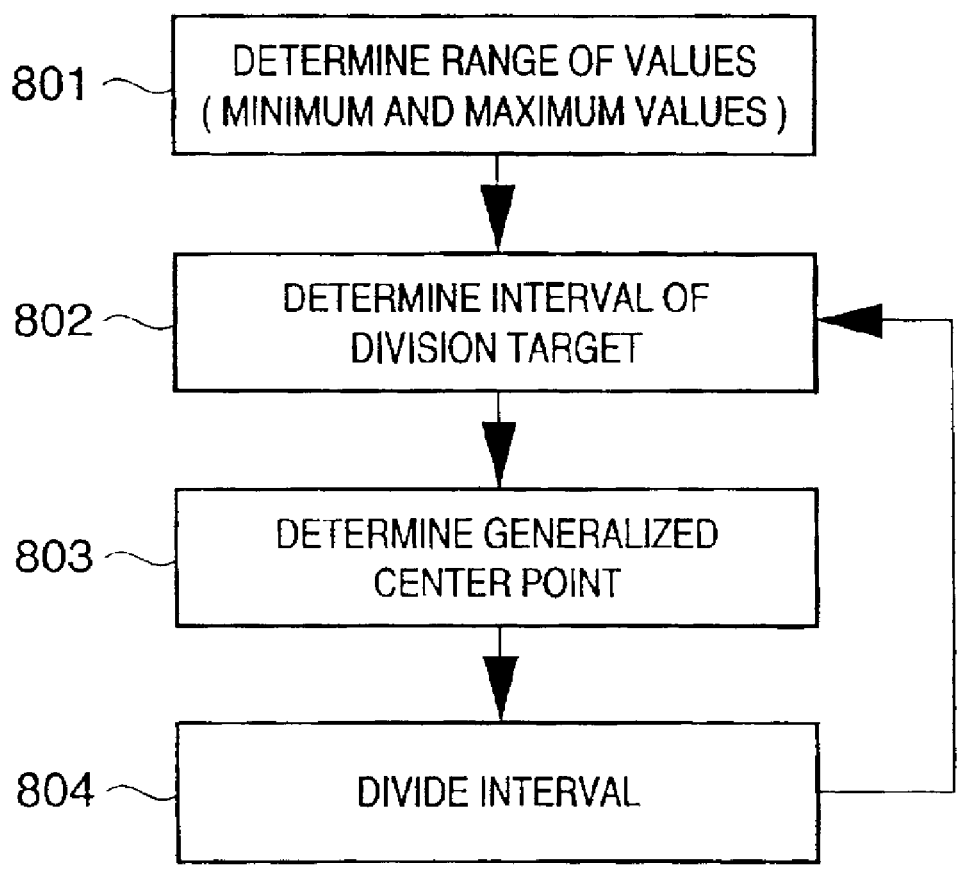

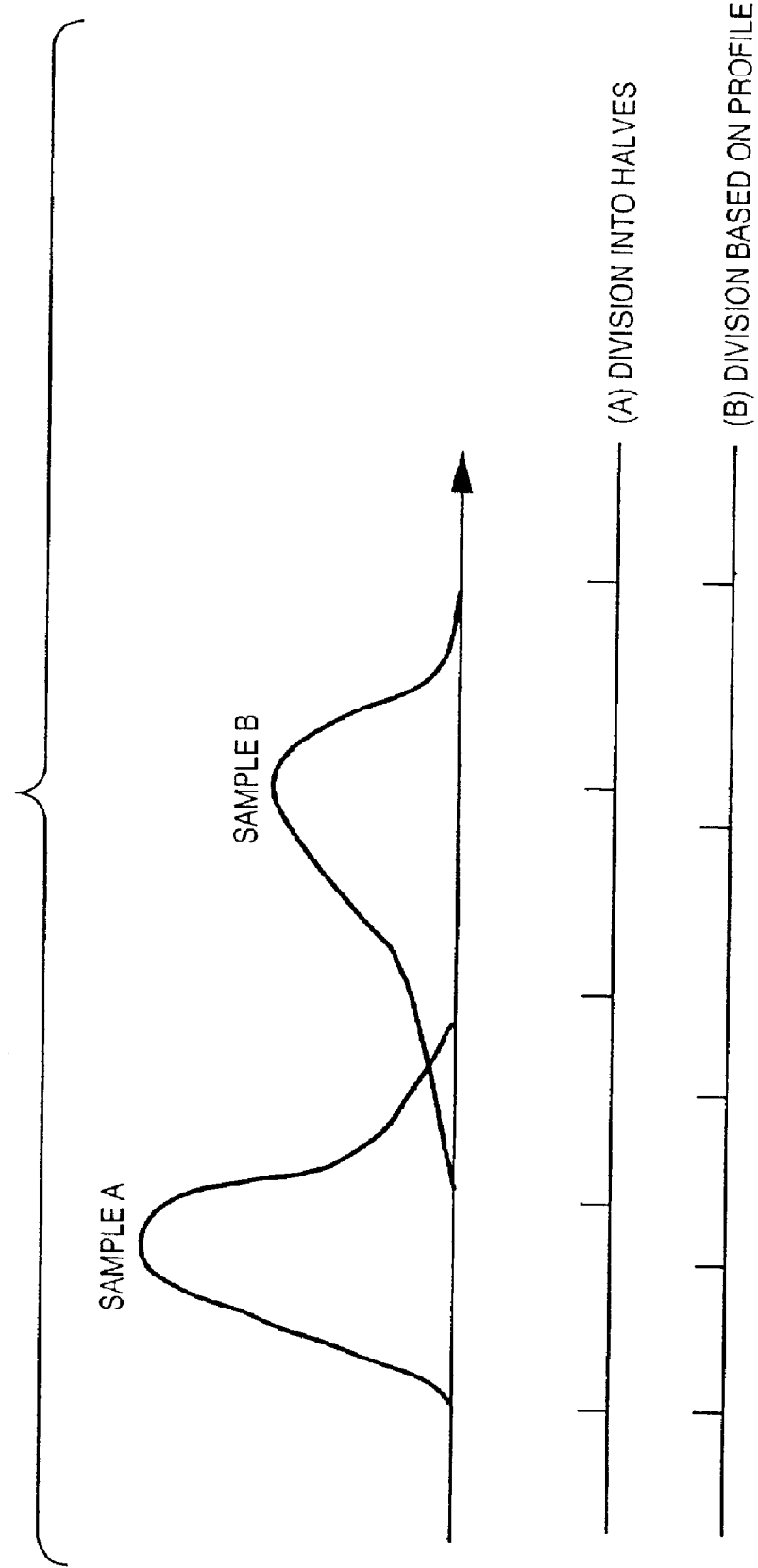

INFORMATION PROCESSING METHOD AND APPARATUS

FIELD OF THE INVENTION

The present invention relates to a technique for recognizing a pattern of an image, character, speech or the like.

BACKGROUND OF THE INVENTION

A so-called classification tree has been widely used as a category determination algorithm applicable to general pattern recognition problems. Generally, a pattern recognition problem can be formulated as a "problem for determining a specific category to which a test pattern expressed as a given point in a feature space belongs when a learning pattern is given as a point set in the feature space".

A variety of algorithms have been proposed for this pattern recognition problem through many years. Among them all, classification trees are the most popular algorithms each for deciding a boundary for classifying category regions on the feature space.

The present applicant has proposed a method of forming a hierarchical structure for each feature amount axis (also referred to as a dimension axis hereinafter) of a feature space and forming a classification tree on the basis of the hierarchical structure in Japanese Patent Application No. 9-187019 (U.S. application Ser. No. 09/112,448, issued as U.S. Pat. No. 6,560,359, issued May 6, 2003).

SUMMARY OF THE INVENTION

It is the main object of the present invention to form an excellent classification tree within a relatively short time.

According to the present invention, there is provided an information processing method of dividing a feature space in which a point set given as learning patterns is present to form a classification tree on the basis of the learning patterns, comprising:

the linear combination feature amount generation step of generating a new feature amount by a linear combination of the feature amounts of the learning patterns;

the hierarchization pre-preprocessing step of hierarchizing, in advance, the new feature amount generated in the linear combination feature amount generation step; and the classification tree generation step of generating a classification tree on the basis of the learning patterns hierarchized in the hierarchization pre-processing step.

According to the present invention, there is also provided an information processing apparatus for dividing a feature space in which a point set given as learning patterns is present to form a classification tree on the basis of the learning patterns, comprising:

linear combination feature amount generation means for generating a new feature amount by a linear combination of the feature amounts of the learning patterns;

hierarchization pre-preprocessing means for hierarchizing, in advance, the new feature amount generated by the linear combination feature amount generation means; and classification tree generation means for generating a classification tree on the basis of the learning patterns hierarchized by the hierarchization pre-processing means.

According to the present invention, there is also provided a program for dividing a feature space in which a point set given as learning patterns is present to form a classification tree on the basis of the learning patterns, the program causing a computer to function as:

linear combination feature amount generation means for generating a new feature amount by a linear combination of the feature amounts of the learning patterns;

hierarchization pre-preprocessing means for hierarchizing, in advance, the new feature amount generated by the linear combination feature amount generation means; and classification tree generation means for generating a classification tree on the basis of the learning patterns hierarchized by the hierarchization pre-processing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing a classification tree and feature space by exemplifying an application to a two-dimensional recognition problem when the feature space is divided using a hyperplane formed by a linear combination of a plurality of feature amount axes to form a classification tree.

FIG. 8 is a flow chart showing the procedures for dividing dimensions in order to determine a plurality of division hyperplanes; and FIG. 9 is a view showing a case in which a feature amount is regressively halved at the middle point of an interval as a generalized center point and a case in which a feature amount is divided at the middle point of an interval as a generalized center point using the profile average of learning patterns.

DETAILED DESCRIPTION OF THE PREFERRED EMBODIMENT

A preferred embodiment of the present invention will now be described in detail in accordance with the accompanying drawings.

Figure 2:
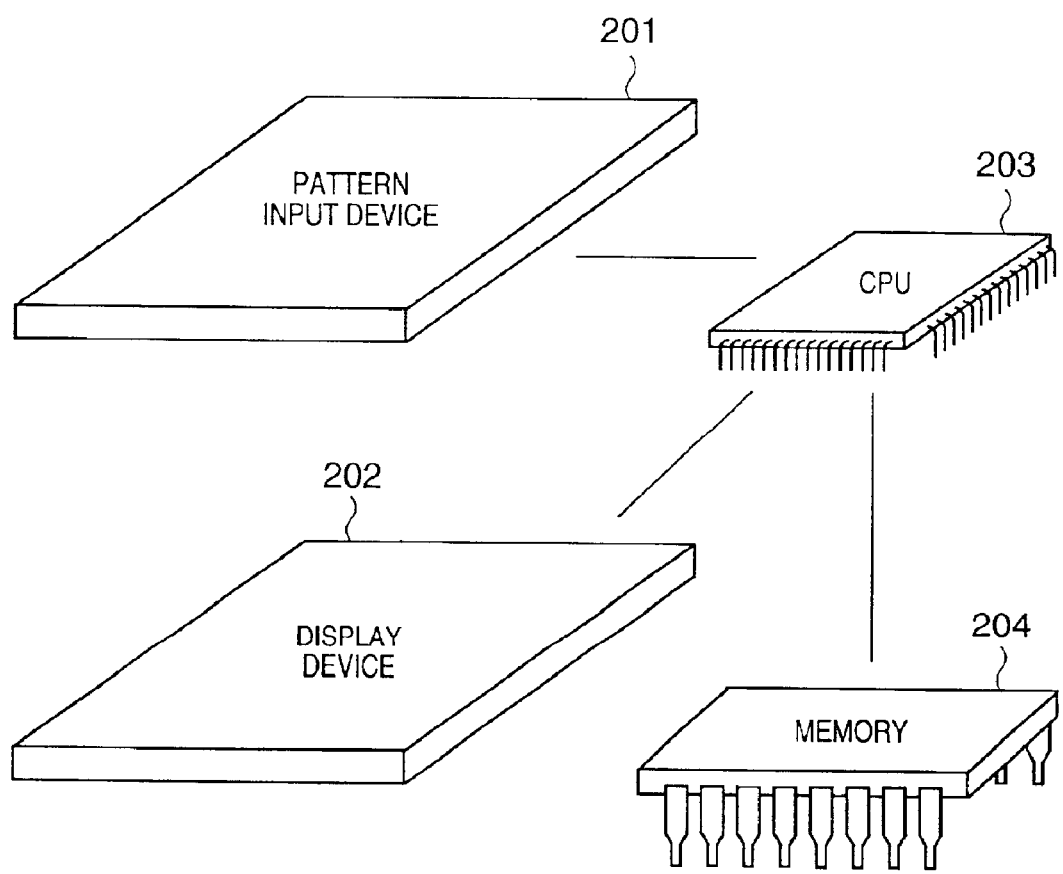
FIG. 2 is a block diagram showing the arrangement of an information processing apparatus according to an embodiment of the present invention.

FIG. 2 is a block diagram showing the arrangement of an information processing apparatus according to an embodiment of the present invention. This information processing apparatus is comprised of a pattern input device 201, display device 202, central processing unit (CPU) 203, and memory 204.

The pattern input device 201 serves as a device for inputting a learning pattern or a pattern to be recognized. For example, for online character recognition, the pattern input device 201 has a digitizer and pen and transfers coordinate data of characters and graphics input on the digitizer with the pen to the CPU 203. Alternatively, any input device for a pattern as a recognition target, such as a scanner or microphone can be employed. Examples of the learning pattern or pattern to be recognized are an image, speech, and character.

The display device 202 displays pattern data input from the pattern input device 201 or the recognition result of the CPU 203. Examples of the display device 202 are a CRT and various devices required for display.

The CPU 203 forms a classification tree (to be described later), recognizes an input pattern, and controls all the devices in accordance with programs stored in the memory 204.

The memory 204 stores a recognition program and dictionaries used by the CPU 203 and temporarily stores input pattern data and variables to be used for the recognition program.

Figure 1:
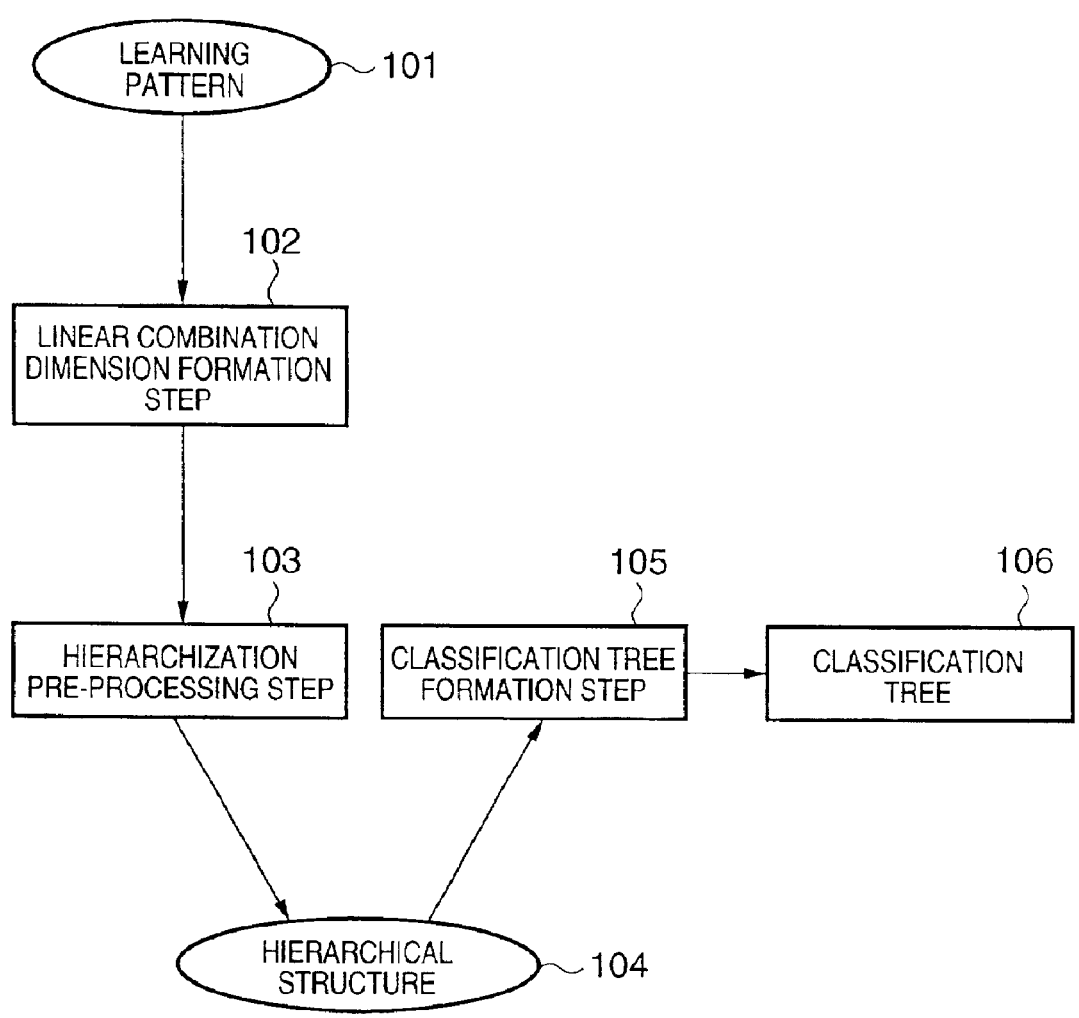
FIG. 1 is a view showing the procedures for forming a classification tree according to an embodiment of the present invention.

FIG. 1 is a view showing, of information processing procedures of this embodiment, procedures for forming a classification tree. Reference numeral 101 denotes an input of a "plurality of learning patterns"; and 102, a procedure for forming a new dimension by a linear combination of the respective dimensions (feature amount axes) of the "plurality of learning patterns", i.e., the "linear combination dimension formation step" of setting a hyperplane using each feature amount as a variable. This step includes setup of a hyperplane perpendicular to each feature amount axis.

Reference numeral 103 denotes the "hierarchization pre-processing step" of dividing the feature space on the basis of the hyperplane formed in the linear combination dimension formation step; and 104, an output of the "hierarchical structure" of the feature space formed in the hierarchization pre-processing. The nodes of the hierarchical structure to which the plurality of learning patterns respectively belong are determined in advance.

Reference numeral 105 denotes the "classification tree formation step" of forming a classification tree on the basis of a plurality of "hierarchical structures"; and 106, a "classification tree" obtained as a result of the "classification tree formation step". In these procedures, the inputs are the "plurality of learning patterns", and the output is the "classification tree".

As described in the "BACKGROUND OF THE INVENTION", generally, a pattern recognition problem can be formulated as a "problem for determining a specific category to which a test pattern expressed as a given point in a feature space belongs when a learning pattern is given as a point set in the feature space". The algorithm of this embodiment is characterized in that a boundary for classifying the respective category regions on the feature space is a hyperplane formed by a linear combination of feature amounts.

Assume that the number of variables (feature amount axes) forming the "learning pattern" in the procedure 102 is d ($X_i$, (i=1, 2, 3, . . . , d-1)). In this case, a hyperplane is represented by $\Sigma A_i X_i = C$. The left-hand side of this equation is called a linear combination of variables. The algorithm of this embodiment has two constraint conditions in forming a classification tree: the first constraint condition pertaining to the coefficient ($A_i$ in the equation) of the hyperplane; and the second constraint condition pertaining to the location (C in the above equation) where the feature space is divided by the hyperplane.

To readily understand the present invention, a case will be briefly described in which a classification tree is formed using a plane perpendicular to the feature amount axis employed in Japanese Patent Application No. 9-187019 (U.S. Ser. No. 09/112,448), and then a case will be described in which a classification tree is formed using a new dimension obtained by a linear combination, which is the characteristic feature of this embodiment.

Figure 3:
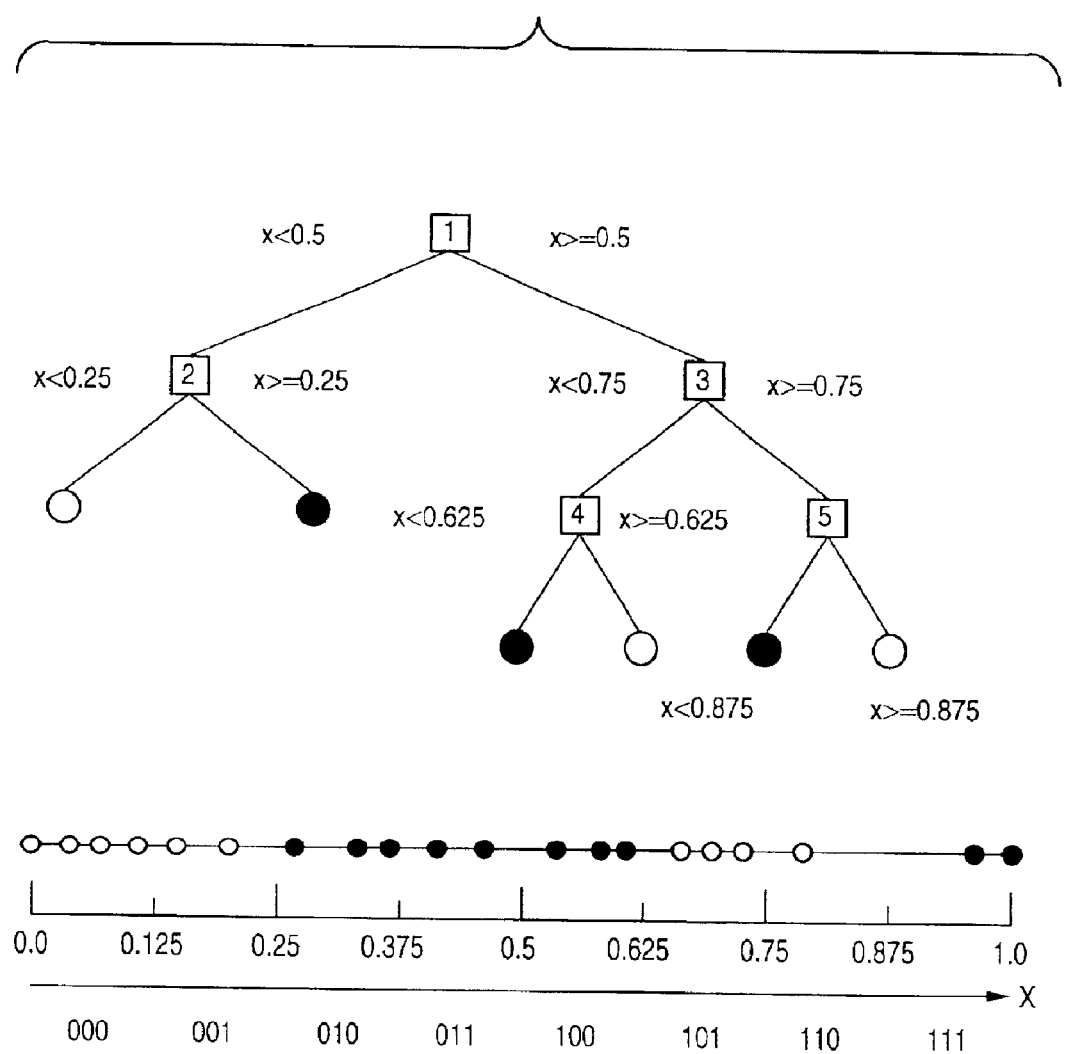
FIG. 3 is a view showing a model when a version using a hyperplane perpendicular to a feature amount axis is applied to a one-dimensional recognition problem.

FIG. 3 is a view showing a model when a version using a hyperplane perpendicular to the feature amount axis is applied to a one-dimensional recognition problem. FIG. 3 shows a classification tree and feature space.

As shown in FIG. 3, to form a classification tree, the feature amount axis (X-axis) is regressively divided by a predetermined hyperplane in advance. The division point is defined as the middle point of the feature amount axis. A line with numerical values in the lower portion of FIG. 3 represents the feature amount axis. Points on this line represent individual learning patterns. The learning patterns indicated by 10 hollow bullets represent samples of category A, while those indicated by 10 bullets represent samples of category B. All the samples are distributed within the range from 0.0 to 1.0.

First of all, assume that the feature space is divided at the middle point, 0.5. In this case, two intervals, [0.0, 0.5] and [0.5, 1.0] are obtained. These intervals are divided at middle points to obtain four intervals, [0.0, 0.25], [0.25, 0.5], [0.5, 0.75], and [0.75, 1.0]. In this manner, the feature space is regressively divided to form the hierarchical structure of division points of the feature amount axis.

In forming a classification tree, the first division point, 0.5 is checked. The division points of the second group, 0.25 and 0.75 are then checked, and finally, the division points of the third group, 0.125, 0.375, 0.615, and 0.875 are checked. The resultant classification tree is shown in the upper portion of FIG. 3.

In the classification tree shown in FIG. 3, each square represents an internal node, and a number in each square represents a node number. A hollow bullet and a bullet represent leaf nodes of categories A and B, respectively. As shown in FIG. 3, all the learning patterns in the route node are classified into samples of less than 0.5 and samples of 0.5 or more.

Internal node No. 2 includes 11 samples, and internal node No. 3 includes 9 samples. If these nodes include samples belonging to a plurality of categories, the nodes serve as internal nodes which are then divided at middle points.

When all the nodes are finally set in a state (=leaf node) in which each node includes only samples belonging to a single category, classification tree formation is complete. As a result, as shown in the upper portion of FIG. 3, the classification tree has five internal nodes and six leaf nodes.

According to the key point of this algorithm, the feature space is divided in a broad sense at first. If necessary, the feature space is further divided. A classification tree for completely classifying learning patterns is formed. Theoretically, the recognition rate for the learning patterns is 100%.

Figure 4:
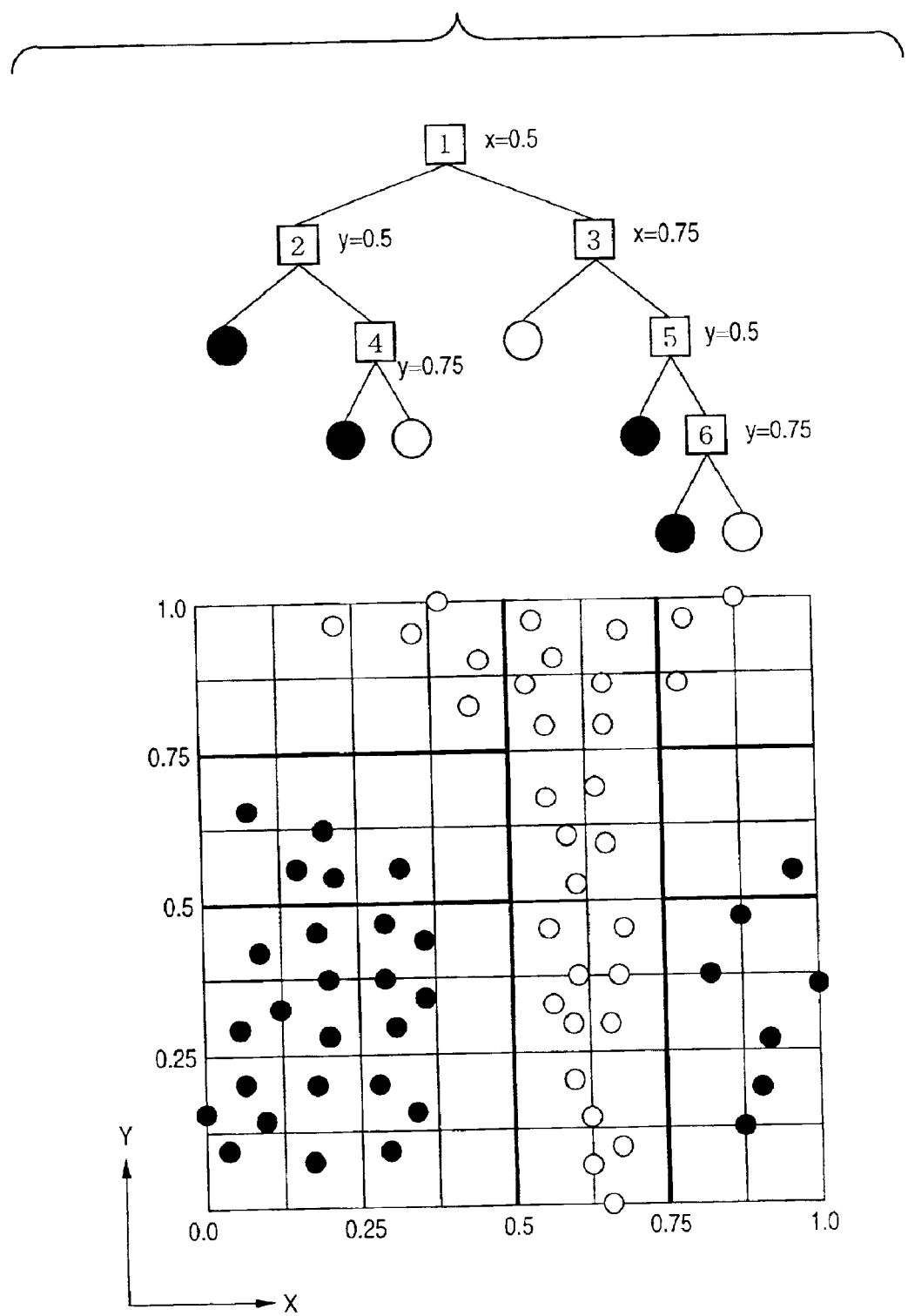
FIG. 4 is a view showing a model when the version using the hyperplane perpendicular to the feature amount axis is applied to a two-dimensional recognition problem.

A version employing a hyperplane perpendicular to the feature amount axis is applied to a two-dimensional recognition problem. FIG. 4 is a view showing a classification tree and feature space in the two-dimensional recognition problem. As in the one-dimensional recognition problem, a feature space is regressively divided by hyperplanes perpendicular to feature amount axes of X- and Y-axes in advance.

As shown in the lower portion of FIG. 4, 32 samples of category A and 32 samples of category B are given as learning patterns. All the learning patterns are distributed in the range of 0.0 to 1.0 of the X- and Y-axes.

As in FIG. 3, the feature space is divided at middle points (x=0.5 and y=0.5) of the x- and Y-axis profile ranges. The feature space is further divided at the middle points of the fragmented intervals (x=0.25, x=0.75, y=0.25, and y=0.75). The resultant intervals are further divided at middle points (x=0.125, x=0.375, x=0.615, x=0.875, y=0.125, y=0.375, y=0.615, and y=0.875).

When the feature space is one-dimensional, no indefinite factors are included in forming a classification tree using this algorithm. However, in a two-dimensional recognition problem, selection of an X- or Y-axis dimension must be determined at each internal node.

For example, at the root node, whether the learning patterns are classified at one of the two middle points (x=0.5 and y=0.5) (i.e., whether the X- or Y-axis hierarchical structure is used) must be determined. An index for this determination is, e.g., a "mutual information amount". This is the expected value of a decrease in entropy $-\Sigma p*\log(p)$ (see L. Breiman, J. H. Friedman, R. A. Olshen, and C. J. Stone, Classification and Regression Trees, Chapman & Hall Inc., New York, N.Y., 1993, p. 33 for further detail).

Note that the algorithm of this embodiment is not characterized by employing the mutual information amount as the index. That is, any index which properly reflects the degree of mixing of categories and allows highly efficient division determination allows use of any mathematical expression. In addition, as indicated in the example described with reference to FIG. 3, the process for "selecting the dimension using this index" need not always be performed.

A practical process for selecting the dimension is shown with reference to FIG. 4. The category balance at the root node is given as (A: 32, B: 32, entropy: 0.69). When the feature space is divided by the hyperplane of x=0.5, the balance of the child node categories is given as (A: 5, B: 25, entropy: 0.45) in the range of x<0.5 and (A: 27, B: 7, entropy: 0.51) in the range of x≧0.5.

When the feature space is divided by the hyperplane of y=0.5, the balance becomes (A: 20, B: 6, entropy: 0.57) in the range of y≧0.5 and (A: 12, B: 26, entropy: 0.63) in the range of y<0.5. These two choices are available at the root node. In this case, the balance having a higher efficiency is selected using the entropy as the index for classification efficiency. In the former case, the expected value of the decrease in entropy is given as (30/64*0.45+34/64*0.51)−0.69=0.21. In the latter case, the expected value is given as (26/64*0.57+38/64*0.63)−0.69=−0.08. Division of the learning patterns by the hyperplane of x=0.5 with a larger expected value of a decrease in entropy is selected.

All the internal nodes are evaluated as to whether the feature space is divided by the hyperplane perpendicular to the X- or Y-axis.

Equations attached to the right of the internal nodes in FIG. 4 represent determination lines as the hyperplanes used at the corresponding nodes. These determination lines correspond to the thick lines written in the feature space in the lower portion of FIG. 4. Generally, the classification efficiency for forming a classification tree increases upon freely changing the determination point. However, since the determination point is fixed, the algorithm of this embodiment requires a very small calculation amount.

A case will be described below in which the feature space is divided using a hyperplane formed by a linear combination of a plurality of feature amount axes (dimensions) to form a classification tree, which is the characteristic feature of this embodiment, for an application to a two-dimensional recognition problem. FIG. 5 shows a classification tree and feature space in the two-dimensional recognition problem.

By setting a constraint condition that a coefficient in a linear combination of the dimensions of the feature space is selected from a given specific set, a more flexible hyperplane can be used as a determination boundary as compared with the hyperplane perpendicular to the above-mentioned feature amount axis although the flexible hyperplane is restricted as compared with perfect free selection of a hyperplane.

Three values, $\{-1, 0, 1\}$ are selected as a coefficient set in FIG. 5. The sets of linear combinations are x+y, x−y, x, and y. Note that the number of combinations of all the coefficients is twice the sets of linear combinations but can be halved on the basis of symmetry.

Generally speaking, when the above three values are selected as a coefficient set, a set of $(3^d-1)/2$ linear combinations is obtained in the d-dimensional recognition problem. The feature amount space is regressively divided to form a hierarchical structure using a hyperplane determined by the linear combination. The classification tree is formed while determining which one of the hierarchical structures formed for the respective hyperplanes is used for classification using the mutual information amount.

The linear combination dimension formation step as step 102 and the hierarchization pre-processing step as step 103 will be described in detail below.

The lower portion of FIG. 5 shows a learning pattern profile when the number of feature amount axes is two (X- and Y-axes). The set of samples A represented by hollow bullets include 32 elements, while the set of samples B represented by bullets include 32 elements.

A large number of lines in the lower portion of FIG. 5 represent hyperplanes (division hyperplanes in the two-dimensional space are represented by lines). Each vertical line represents a division hyperplane represented by X=Ci, while a horizontal line represents a division hyperplane represented by Y=Cj. A line obliquely downward toward the right represents a division hyperplane formed by a linear combination of feature amount axes and represented by X+Y=Ck, while a line obliquely upward toward the right represents a division hyperplane formed by a linear combination of feature amount axes and represented by X−Y=Cl. Incidentally, Ci, Cj, Ck, and Cl are different values by each of lines shown in the Figure.

In this embodiment, in step 102, the feature amount axes are linearly combined to determine a division hyperplane. In FIG. 5, since the coefficients a and b of the linear combination (aX+bY) are selected from $\{-1, 0, 1\}$, the hyperplanes obtained by this linear combination are represented by X=Ci, Y=Cj, X+Y=Ck, and X−Y=Cl, respectively. When the coefficients of the linear combination are freely taken, the degree of freedom for division hyperplanes increases to increase the classification efficiency. However, the calculation amount for classification tree formation increases accordingly, and it takes a long time to form a classification tree. For this reason, according to this embodiment, the number of coefficients of a linear combination is limited to greatly shorten the time for forming a hierarchical structure and classification tree.

In this embodiment, the feature amount axes are linearly combined to form a hyperplane. It is easy to calculate the normal vector of this hyperplane. For example, the normal vector of the hyperplane aX+bY=C formed by linearly combining the two-dimensional feature amount axes is given as (a,b). The direction of this normal vector represents the direction of the newly formed dimension (feature amount). That is, the feature amount axes are linearly combined to form a new feature amount (dimension). The feature space is hierarchically divided using a plurality of hyperplanes (the plurality of hyperplanes are parallel to each other) perpendicular to the newly formed dimension.

In FIG. 5, the set of coefficients of the linear combination is given as {−1, 0, 1}. However, the set of coefficients need not be limited to this. For example, the set of coefficients may be {−1, −½, 0, ½, 1}.

In the hierarchization pre-processing step as step 103, the feature amount space is hierarchically divided using the division hyperplane having the normal vector formed in step 102 to form a hierarchical structure for each dimension. In dividing the feature amount space using the division hyperplane aX+bY=C, the range of values taken by aX+bY is determined on the basis of the learning pattern profile. The maximum and minimum values of the range of the learning pattern profile are obtained for each newly formed dimension. The feature amount space is regressively halved on the basis of this profile range to form a hierarchical structure.

Figure 7A:
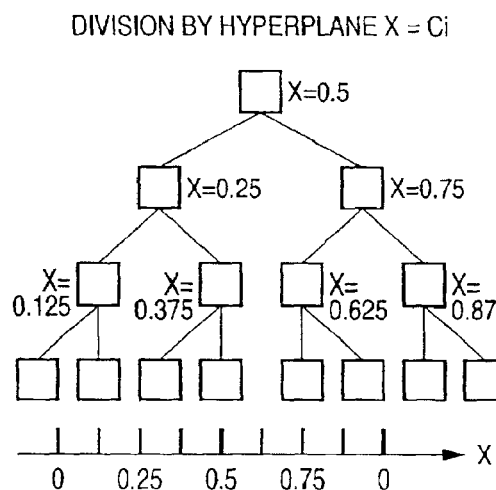
FIGS. 7A to 7D are views showing hierarchical structures formed by regressively halving the feature space.
Figure 7C:
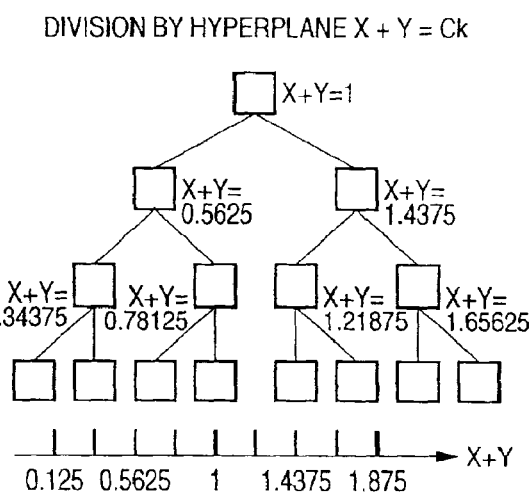
Figure 7B:
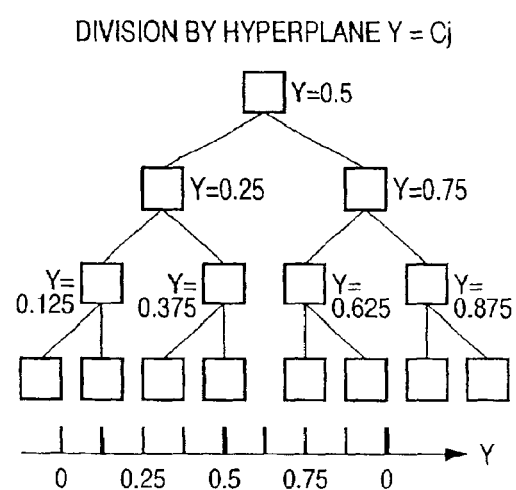
Figure 7D:
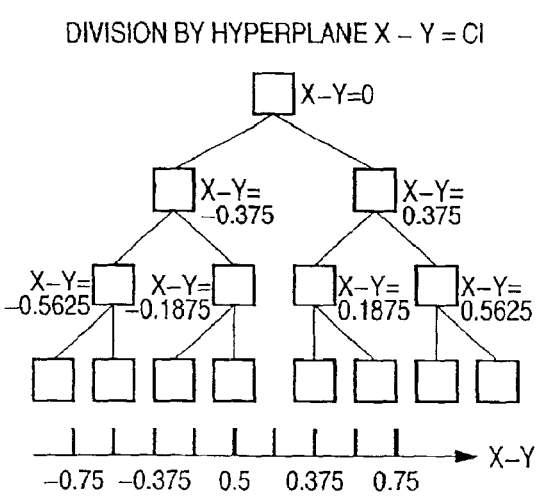

In FIG. 5, in dividing the feature amount space by a hyperplane X=Ci, the range of a feature amount X has a minimum value of 0 and a maximum value of 1. Similarly, in dividing the feature amount space by a hyperplane Y=Cj, the range of a feature amount Y has a minimum value of 0 and a maximum value of 1. In dividing the feature amount space by a hyperplane X+Y=Ck, the range of a feature amount (X+Y) has a minimum value of 0.125 and a maximum value of 1.875. In dividing the feature amount space by a hyperplane X−Y=Cl, the range of a feature amount (X−Y) has a minimum value of −0.75 and a maximum value of 0.75. The feature amount space is regressively halved for each feature amount (dimension) on the basis of this profile range to determine a plurality of division hyperplanes to be used (determination of values of Ci, Cj, Ck, and Cl), thereby forming a hierarchical structure. FIGS. 7A to 7D show hierarchical structures obtained by regressively halving the feature amount space. FIG. 7A shows a hierarchical structure when the feature amount space is divided by the hyperplane X=Ci. FIG. 7B shows a hierarchical structure when the feature amount space is divided by the hyperplane Y=Cj. FIG. 7C shows a hierarchical structure when the feature amount space is divided by the hyperplane X+Y=Ck. FIG. 7D shows a hierarchical structure when the feature amount space is divided by the hyperplane X−Y=Cl.

This embodiment has a 4-layered hierarchical structure. Preferably, nodes of the hierarchical structure to which learning pattern samples respectively belong are determined, and the nodes are branched up to each sample category to form a hierarchical structure.

In this embodiment, the division points are determined on the basis of the range of the learning sample profile. However, the minimum and maximum values of the profile range may be changed in consideration of learning sample errors. For example, in this embodiment, the range of values taken by X+Y has the minimum value of 0.125 and the maximum value of 1.875, but may have the minimum value of 0 and the maximum value of 2 with some margin. Alternatively, values as the difference between and the sum of the average value and a value twice the standard deviation are defined as the minimum and maximum values. The use of the standard deviation has an advantage in that the profile range is not excessively widened even in the presence of samples having very large or small values.

In this embodiment, a hierarchical structure is formed while the feature amount range is halved. However, the feature amount range need not be halved, and the division point may be determined on the basis of the learning pattern profile.

FIG. 8 is a flow chart showing the procedures for dividing the dimension (feature amount) in order to determine a plurality of division hyperplanes.

In step 801, the range of values (minimum and maximum values) is determined, as described above.

In step 802, the interval of a feature amount as a division target is determined. At first, the interval is the range of values determined in step 801.

A division point in the division target interval is determined as the generalized center point. The generalized center point may be the middle point of the interval, as described above or a point at which the number of leaning patterns upon division becomes uniform on the basis of the learning pattern profile of the interval. The generalized center point may be obtained by using statistics such as a median.

In step 804, the interval is divided at the generalized center point to form a new interval. The flow returns to step 802 to regressively divide the interval to form a hierarchical structure.

FIG. 9 shows a case in which the middle point of the interval as the generalized center point is regressively halved and a case in which the profile average value of the learning patterns is used to divide the interval.

The graph in the upper portion of FIG. 9 shows an overall profile histogram of learning patterns (sample set) pertaining to a given dimension (feature amount). Line A below the histogram represents a division point when the interval is halved at the middle point, and line B represents a division point when the interval is regressively divided such that the numbers of sample sets are equal to each other.

As described above, a hierarchical structure 104 for each feature dimension axis shown in FIG. 7 is obtained by the hierarchization in step 103. At this time, nodes to which the plurality of learning patterns respectively belong are determined. In the next step 105, the classification efficiency in forming a classification tree is calculated using the pattern profile at each node. A classification tree is then formed.

The classification tree formation step as step 105 will be described in detail with reference to FIGS. 7A to 7D. In forming a classification tree, the classification efficiency is calculated on the basis of the learning pattern profile at a node of level in the hierarchical structure 104. A classification tree is formed while determining a feature dimension axis to be used.

At the route node in FIG. 5, four choices using hyperplanes using as variables the feature amounts of x=0.5 and y=0.5 and x+1=1.0 and x−y=0.0 are available. The mutual calculation amounts are calculated to select a hyperplane which maximizes the classification efficiency. In this case, x=0.5 is selected. Similarly, the second node has four choices, x=0.25, y=0.5, x+y=1.0, and x−y=0.0; the third node, x=0.75, y=0.5, x+y=1.0, and x−y 0.0; and the fourth node, x=0.875, y=0.5, x+y=1.0, and x−y=0.0.

The mutual information amounts of the four choices are calculated at the respective nodes to select hyperplanes having higher classification efficiencies as division planes. The processing is repeated until each node contains one category (until a leaf is obtained), thereby forming a classification tree. Note that if no category is determined up to a node of level formed in the hierarchical structure 104, the node may be set unknown.

Finally, as shown in the upper portion of FIG. 5, a classification tree including four internal nodes and five leaf nodes is formed.

As described above, according to this embodiment, a preset hyperplane is appropriately selected to divide the feature space. Operation of calculating a hyperplane each time can be greatly reduced, and a classification tree can be formed within a relatively short time.

The procedures for pattern recognition based on the classification tree formed by the above procedures will be briefly described.

Figure 6:
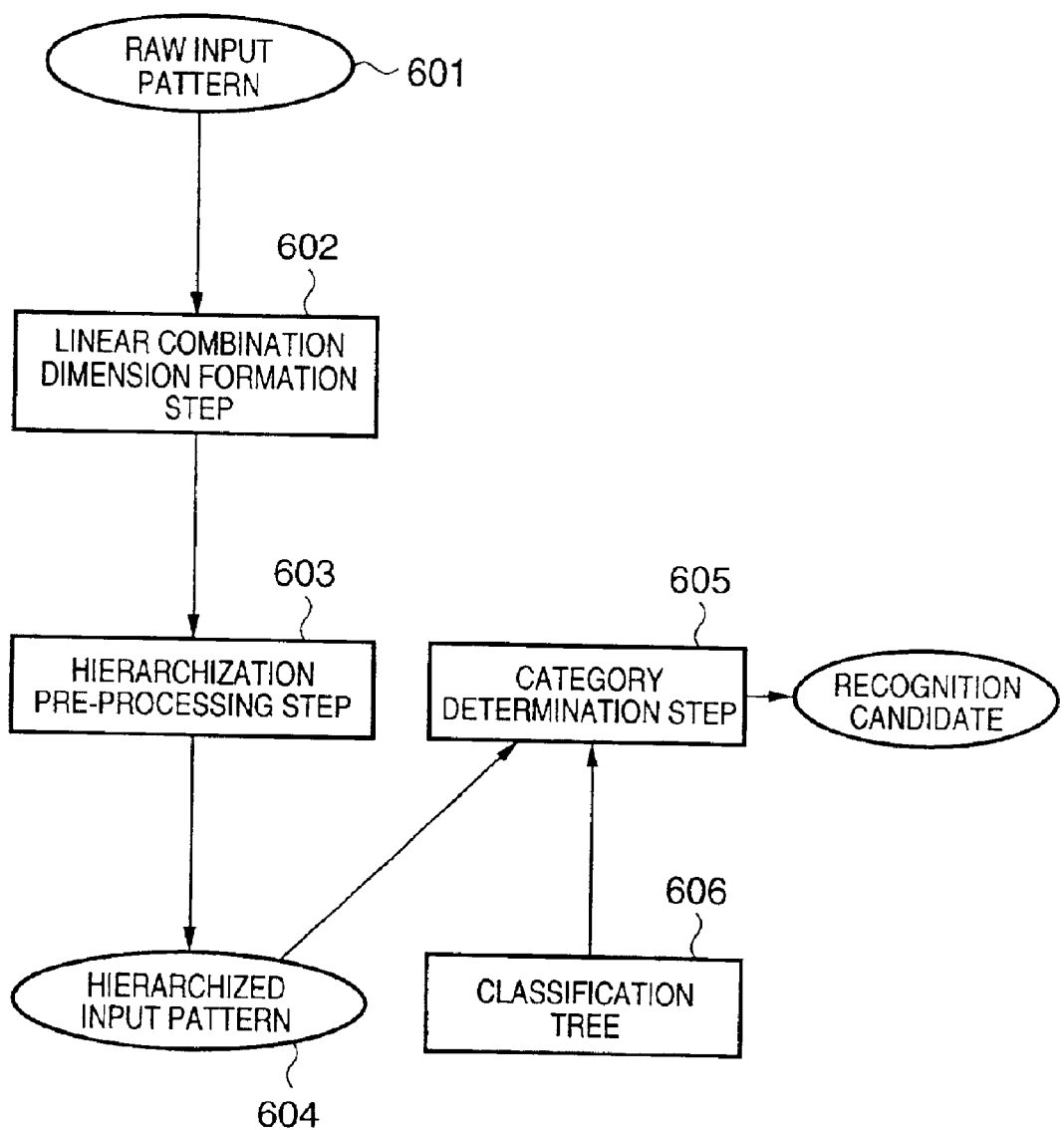
FIG. 6 is a view showing pattern recognition procedures in the embodiment of the present invention.

FIG. 6 is a view showing the pattern recognition procedures. Reference numeral 601 denotes a "raw input pattern" as the recognition target; 602, the "linear combination dimension formation step" for forming a new dimension by linear combinations of the respective dimensions (feature amounts) of the "raw input pattern" as in the linear combination of FIG. 5; 603, the "hierarchization pre-processing step" for hierarchically dividing the new dimension formed in the linear combination dimension formation step to determine a node to which the input pattern belongs, as in FIG. 7; 604, a "hierarchized input pattern" having undergone hierarchization pre-processing; 606, a "classification tree" formed by the above-mentioned procedures; and 605, the "category determination step" for obtaining the determination probability of the category on the basis of the "hierarchized input pattern" and "classification tree".

The input in these procedures is the "raw input pattern", and the output is a "recognition candidate".

The "raw input pattern" 601 corresponds to the "raw learning pattern" 101 in FIG. 1 although the pattern is the recognition or learning target. The "linear combination dimension formation step" 602 and the "hierarchization pre-processing step" 603 are the same as the corresponding procedures in FIG. 1.

On the basis of the "hierarchized input pattern" 604, the "category determination step" 605 outputs as a recognition result the most likelihood category present in a leaf upon tracing a classification tree to reach the leaf. When the trace reaches no leaf, a category probability included in the last node through the trace has passed is output as the result.

The preferred embodiment of the present invention has been described above. The object of the present invention is achieved even by supplying program codes of software for implementing the functions of the above-described embodiment or a program product such as a storage medium (or recording medium) which stores them to a system or apparatus and causing the computer (or a CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes. The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. An information processing method of dividing a feature space in which a point set given as learning patterns is present to form a classification tree on the basis of the learning patterns, comprising:

a linear combination feature amount generation step of generating a plurality of new feature amounts by a linear combination of feature amounts of the learning patterns;

a hierarchization pre-processing step of forming a plurality of hierarchical structures of the learning patterns by hierarchizing, each of the plurality of the new feature amounts generated in said linear combination feature amount generation step; and a classification tree generation step of generating a classification tree on the basis of the plurality of hierarchical structures formed in said hierarchization pre-processing step.

2. The method according to claim 1, wherein in said linear combination feature amount generation step, a coefficient of the linear combination is selected from a fixed set of coefficients.

3. The method according to claim 1, wherein in said hierarchization pre-processing step, each of the plurality of the new feature amounts is hierarchized on the basis of a normal vector of a hyperplane formed by the linear combination in said linear combination feature amount generation step and a hyperplane having the normal vector.

4. The method according to claim 3, wherein the hyperplane used in said hierarchization pre-processing step includes a hyperplane perpendicular to a feature amount axis.

5. The method according to claim 1, wherein
in said classification tree formation step, a classification efficiency is calculated from the hierarchical structure of each of the plurality of the new feature amounts at each node, a feature amount used on the basis of the classification efficiency is determined, and a classification tree is formed.

6. The method according to claim 1, further comprising a recognition step of recognizing a newly input pattern using the classification tree formed in said classification tree formation step.

7. The method according to claim 1, wherein in said hierarchization pre-processing step, each of the plurality of the new feature amounts is hierarchized on the basis of a range of values which can be taken by the learning patterns.

8. The method according to claim 1, wherein in said hierarchization pre-processing step, each of the plurality of the new feature amounts is hierarchized on the basis of a profile of the learning patterns.

9. The method according to claim 1, wherein the learning pattern is any one of an image pattern, a speech pattern, and a character pattern.

10. An information processing apparatus for dividing a feature space in which a point set given as learning patterns is present to form a classification tree on the basis of the learning patterns, comprising:

linear combination feature amount generation means for generating a plurality of new feature amounts by a linear combination of feature amounts of the learning patterns;

hierarchization pre-preprocessing means for forming a plurality of hierarchical structures of the learning patterns by hierarchizing each of the plurality of the new feature amounts generated by said linear combination feature amount generation means; and classification tree generation means for generating a classification tree on the basis of the plurality of hierarchical structures formed by said hierarchization pre-processing means.

11. A program stored in a computer-readable medium for controlling a computer to divide a feature space in which a point set given as learning patterns is present to form a classification tree on the basis of the learning patterns, the program comprising:

linear combination feature amount generation program codes instructing the computer to generate a plurality of new feature amounts by a linear combination of feature amounts of the learning patterns;

hierarchization pre-preprocessing program codes instructing the computer to form a plurality of hierarchical structures of the learning patterns by hierarchizing each of the plurality of the new feature amounts generated by the computer in response to instructions from said linear combination feature amount generation program codes; and classification tree generation program codes instructing the computer to generate a classification tree on the basis of the plurality of hierarchical structures formed by the computer in response to instructions by said hierarchization pre-processing program codes.

* * * * *